(12) United States Patent
Uchida

(10) Patent No.: US 8,176,260 B2
(45) Date of Patent: May 8, 2012

(54) RECORDING CONTROLLER INCLUDING SNOOP UNIT ISSUING INVALIDATION REQUEST AND RESPONSE UNIT OUTPUTTING NOTIFICATION INDICATING IDENTIFICATION INFORMATION FOR INDENTIFYING RECORDING REQUEST AND RECORDING CONTROL METHOD THEREOF

(75) Inventor: Kenji Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 576 days.

(21) Appl. No.: 12/222,058

(22) Filed: Jul. 31, 2008

(65) Prior Publication Data

US 2008/0294849 A1 Nov. 27, 2008

Related U.S. Application Data

(63) Continuation of application No. PCT/JP2006/303438, filed on Feb. 24, 2006.

(51) Int. Cl.
*G06F 13/00* (2006.01)
(52) U.S. Cl. ......... 711/141; 711/144; 711/145; 711/146
(58) Field of Classification Search .................. 711/141, 711/144, 145, 146
See application file for complete search history.

(56) References Cited

U.S. PATENT DOCUMENTS

| 5,615,343 | A | | 3/1997 | Sarangdhar et al. | |
|---|---|---|---|---|---|
| 5,623,629 | A | * | 4/1997 | Suzuki | 711/141 |
| 5,717,898 | A | * | 2/1998 | Kagan et al. | 711/145 |
| 5,740,401 | A | | 4/1998 | Hanawa et al. | |
| 5,829,039 | A | | 10/1998 | Sugino et al. | |
| 6,263,405 | B1 | | 7/2001 | Irie et al. | |
| 2002/0199066 | A1 | * | 12/2002 | Chaudhry et al. | 711/141 |
| 2003/0177320 | A1 | * | 9/2003 | Sah et al. | 711/158 |
| 2003/0217235 | A1 | * | 11/2003 | Rowlands | 711/141 |
| 2004/0117561 | A1 | * | 6/2004 | Quach et al. | 711/146 |
| 2004/0215897 | A1 | * | 10/2004 | Arimilli et al. | 711/144 |
| 2007/0083716 | A1 | * | 4/2007 | Rajamony et al. | 711/141 |
| 2008/0313409 | A1 | * | 12/2008 | Endo et al. | 711/141 |
| 2009/0006668 | A1 | * | 1/2009 | Vasudevan et al. | 710/33 |

FOREIGN PATENT DOCUMENTS

| JP | 57-176588 | 10/1982 |
|---|---|---|
| JP | 2-161550 | 6/1990 |
| JP | 2-161551 | 6/1990 |
| JP | 2-294761 | 12/1990 |
| JP | 3-147153 | 6/1991 |

(Continued)

OTHER PUBLICATIONS

International Search Report mailed Oct. 10, 2006 of International Application No. PCT/JP2006/303438.

(Continued)

*Primary Examiner* — Hong Kim
(74) *Attorney, Agent, or Firm* — Fujitsu Patent Center

(57) ABSTRACT

In a recording controller, an invalidation-request issuing unit, when a second data is recorded on a recording location for a first data that is to be recorded in a memory and a third data corresponding to the second data is recorded in the cache, issues an invalidation request for invalidating the third data, and a notifying unit, when the third data is invalidated, outputs data for identifying a recording request for the first data to an output source of the recording request, and notifies to the output source that recording of the first data is completed.

8 Claims, 5 Drawing Sheets

FOREIGN PATENT DOCUMENTS

| | | |
|---|---|---|
| JP | 5-210640 | 8/1993 |
| JP | 5-233531 | 9/1993 |
| JP | 7-325760 | 12/1995 |
| JP | 8-63426 | 3/1996 |
| JP | 9-101943 | 4/1997 |
| JP | 10-105464 | 4/1998 |
| JP | 10-505184 | 5/1998 |
| JP | 10-320281 | 12/1998 |
| JP | 11-65928 | 3/1999 |
| JP | 11-110343 | 4/1999 |
| JP | 2000-172656 | 6/2000 |
| JP | 2000-181891 | 6/2000 |

OTHER PUBLICATIONS

Japanese Office Action, English-language Translation, mailed Apr. 7, 2009 for corresponding Japanese Application No. 2008-501537.

* cited by examiner

| REQUEST ID | ADDRESS | STORAGE TARGET DATA |
|---|---|---|
| R0001 | AAA | (DATA RECORDED IN MEMORY) |
| R0002 | BBB | (DATA RECORDED IN MEMORY) |
| R0003 | CCC | (DATA RECORDED IN MEMORY) |
| ⋮ | ⋮ | ⋮ |

| LOCK NUMBER | LOCK VALID DATA | REQUEST ID | ADDRESS |
|---|---|---|---|
| 0 | VALID | R0001 | AAA |
| 1 | VALID | R0022 | BBB |
| 2 | INVALID | R0015 | CCC |
| ⋮ | ⋮ | ⋮ | ⋮ |
| n-1 | INVALID | R0052 | DDD |
| n | VALID | R0004 | EEE |

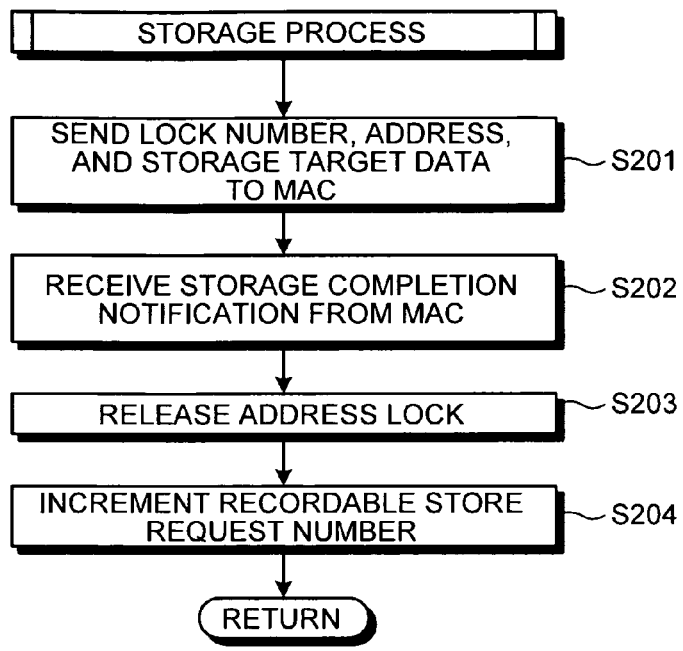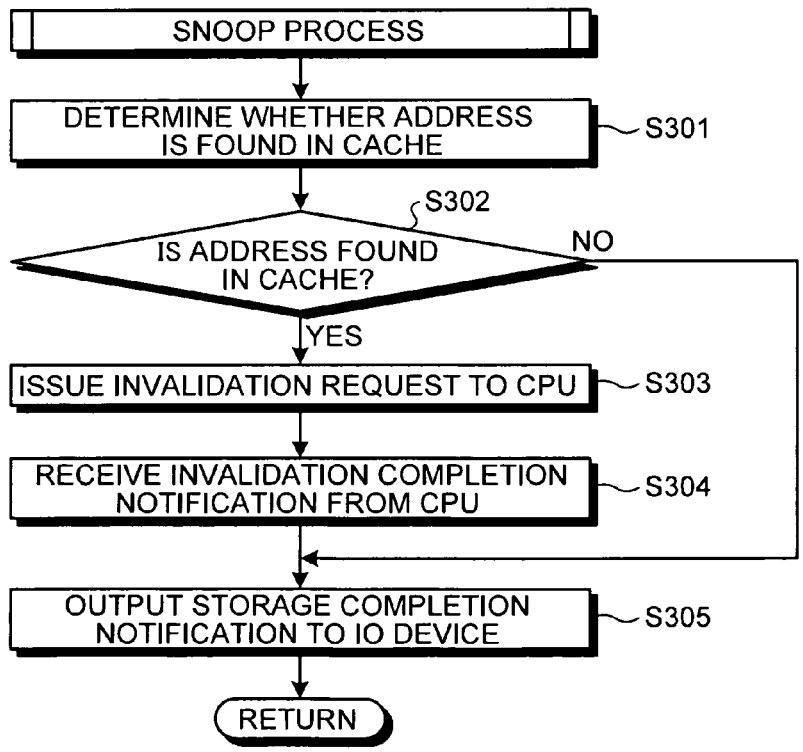

US 8,176,260 B2

RECORDING CONTROLLER INCLUDING SNOOP UNIT ISSUING INVALIDATION REQUEST AND RESPONSE UNIT OUTPUTTING NOTIFICATION INDICATING IDENTIFICATION INFORMATION FOR INDENTIFYING RECORDING REQUEST AND RECORDING CONTROL METHOD THEREOF

CROSS-REFERENCE TO RELATED APPLICATION

This application is a continuation of International Application No. PCT/JP2006/303438, filed on Feb. 24, 2006.

BACKGROUND OF THE INVENTION

1. Field of the Invention

The present invention relates to a technology for controlling recording of data in a cache and a memory provided in a processor.

2. Description of the Related Art

Conventionally, an input/output (IO) device outputs a data store request to a system controller that controls data recording in a main storage device. When a sequential guarantee is necessary for the store request, the IO device needs to await a completion notification (hereinafter, "storage completion notification") for the store request from the system controller before outputting the subsequent store request to the system controller.

However, depending on whether data corresponding to a store request address is found in a cache in a central processing unit (CPU), the system controller that receives the store request issues an invalidation request for the data in the cache and also records in the main storage device, the data (hereinafter, "storage target data") that is to be stored. Upon completion of an invalidation process for the cache and recording of the storage target data, the system controller outputs the storage completion notification to the IO device.

Consequently, the IO device cannot output the subsequent store request until the storage completion notification from the system controller is received, so that the storage target data cannot be processed rapidly.

To resolve the above problem, a technology is disclosed in Japanese Patent Application Laid-open No. 2000-181891, in which upon receiving the store request, a storage control device that controls input and output of the data stored in the main storage device sends, without awaiting completion of storage target data recording, the storage completion notification to a store request source once the data invalidation process is complete.

However, in the conventional technology, with an increase in the storage target data that is processed by the IO device, a circuitry for managing the storage target data becomes complicated and the storage target data cannot be efficiently managed.

SUMMARY OF THE INVENTION

It is an object of the present invention to at least partially solve the problems in the conventional technology.

According to an aspect of the present invention, there is provided a recording controller that controls recording of data in a cache and a memory provided in a processor, the recording controller including an invalidation-request issuing unit that, when a second data is recorded on a recording location for a first data that is to be recorded in the memory and a third data corresponding to the second data is recorded in the cache, issues an invalidation request for invalidating the third data; and a notifying unit that, when the third data is invalidated, outputs data for identifying a recording request for the first data to an output source of the recording request, and notifies to the output source that recording of the first data is completed.

According to another aspect of the present invention, there is provided a recording control method for controlling recording of data in a cache and a memory provided in a processor, the method including issuing, when a second data is recorded on a recording location for a first data that is to be recorded in the memory and a third data corresponding to the second data is recorded in the cache, an invalidation request for invalidating the third data; and notifying including, when the third data is invalidated, outputting data for identifying a recording request for the first data to an output source of the recording request, and notifying to the output source that recording of the first data is completed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is an example of data recorded in a request control table;

FIG. 3 is an example of data recorded in an address lock register;

FIG. 6 is a flowchart of a storage process; and

FIG. 7 is a flowchart of a snoop process.

DETAILED DESCRIPTION OF THE PREFERRED EMBODIMENTS

Exemplary embodiments of according to the present invention are explained in detail below with reference to the accompanying drawings. The present invention is not limited to the embodiments.

When a request (hereinafter, "store request") for recording data in a memory is received, the recording controller according to an embodiment refers to a memory storage destination address of the data (hereinafter, "storage target data") included in the received store request and recorded in the memory. When a storage target data address is found in a cache, the recording controller outputs to a central processing unit (CPU), an invalidation request for the data (hereinafter, "invalidation target data") found in the cache.

When a notification (hereinafter, "invalidation completion notification") is received from the CPU indicating that the invalidation target data is invalidated, even though the storage target data has not been recorded in the memory, the recording controller outputs a notification (hereinafter, "storage completion notification") to a store request output source and notifies that the storage target data recording is complete. The storage completion notification includes data for identifying a store request (hereinafter, "request identification (ID)").

Thus, the recording controller of the present embodiment outputs the storage completion notification to the store request output source when an invalidation process of the CPU is complete. Therefore, a device (hereinafter, "input/output (I/O) device") that serves as the store request output source can rapidly process the storage target data, thus enhancing performance of an entire system that includes the recording controller.

The IO device needs to associate the storage target data with the request IDs to manage the storage target data. Due to this, with an increase in the storage target data, the request IDs also increase, thus making a circuitry of the IO device complicated.

However, the recording controller includes in the storage completion notification, the request IDs of the store requests of which invalidation has been completed, and outputs the request IDs to the IO device. Thus, the IO device can effectively release the request IDs (the request IDs can be used elsewhere) and therefore can curtail the number of request IDs. The number of request IDs managed by the IO device is curtailed, so that the circuitry of the IO device can be simplified and cost can be reduced.

Figure 1:
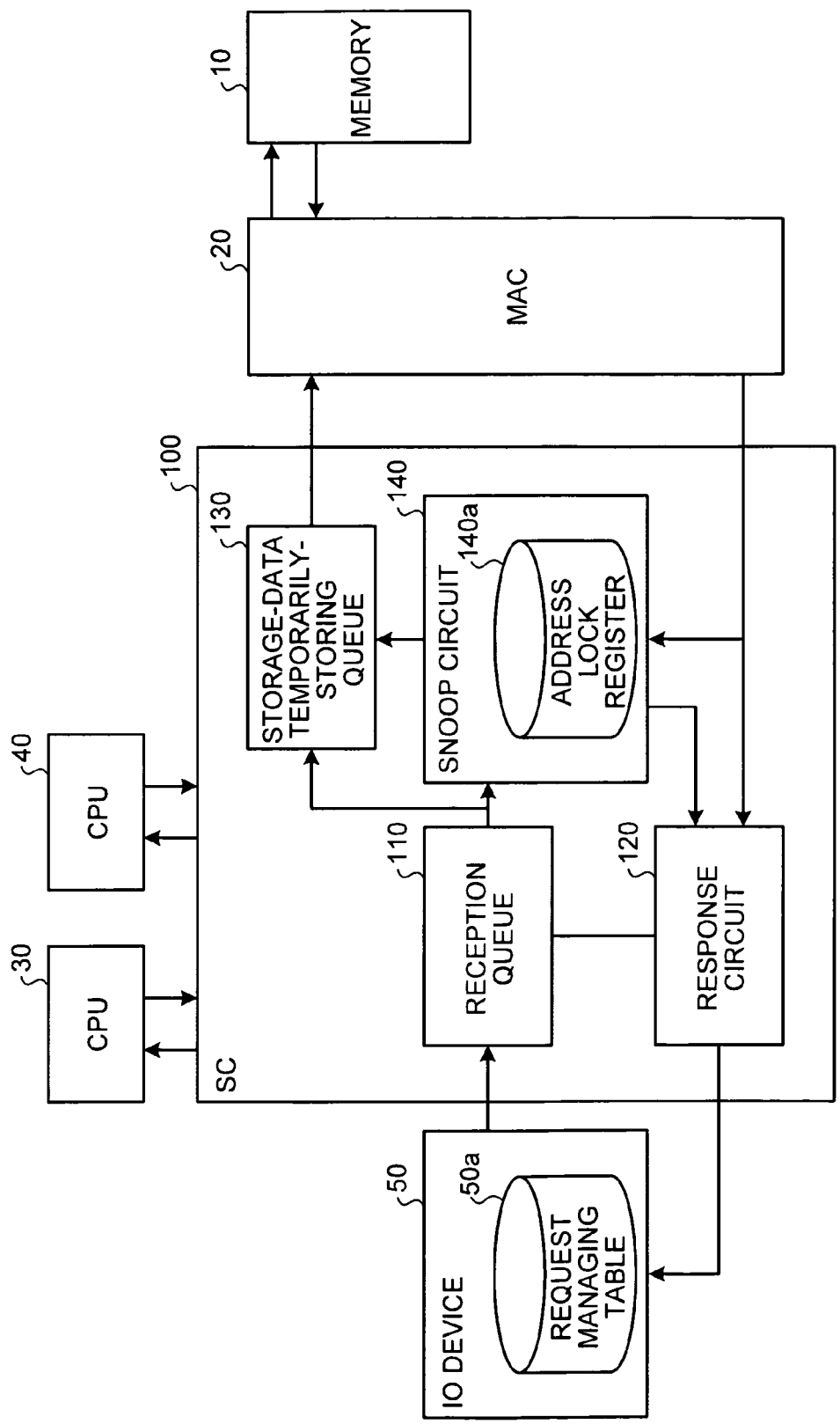
FIG. 1 is a block diagram of a recording control system according to an embodiment of the present invention.

A structure of a recording control system according to the embodiment is explained as one example. FIG. 1 is a block diagram of the recording control system according to the present embodiment that includes a memory 10, a memory access controller (MAC) 20, central processing units (CPU) 30 and 40, an input/output (IO) device 50, and a system controller (SC) 100.

The memory 10 stores the data, commands, etc. used by the CPUs 30 and 40. The MAC 20 controls input and output of the data in the memory 10.

Each of the CPUs 30 and 40 includes a cache. The CPUs 30 and 40 record in the cache, the commands and the data recorded in the memory 10, interpret the commands recorded in the cache, and perform a predetermined operation for the data. In the present embodiment, particularly upon receiving an invalidation target data address, the CPUs 30 and 40 invalidate the data corresponding to the received address and output the invalidation completion notification to an invalidation request output source (SC 100).

The IO device 50 includes a request managing table 50a and issues store requests to the SC 100. FIG. 2 is an example of the data recorded in the request managing table 50a. As shown in FIG. 2, the data recorded in the request managing table 50a includes the request IDs, the addresses, and the storage target data. The request ID is an identification data to uniquely identify each store request. The address indicates an address on the memory 10 that records therein the storage target data. The storage target data indicates the data stored in the memory 10. The IO device 50 sequentially outputs to the SC 100, the store requests that include the request IDs, the addresses, and the storage target data recorded in the request managing table 50a.

Upon receiving the storage completion notification from the SC 100, the IO device 50 refers to the request ID included in the storage completion notification and releases the request ID in the request managing table 50a. For example, if the storage completion notification includes the request ID "R0001", the request ID "R0001" in the request managing table 50a is released and a correspondence is established with a new address and a storage target data.

The SC 100 controls recording of the data in the cache and the memory 10 provided in the CPUs 30 and 40. The SC 100 includes a reception queue 110, a response circuit 120, a storage-data temporarily-storing queue 130, and a snoop circuit 140.

The reception queue 110 sequentially records the store requests output from the IO device 50. The reception queue 110 outputs to the snoop circuit 140, the request IDs and the addresses, which are included in the store requests, and outputs to the storage-data temporarily-storing queue 130, the storage target data that is included in the store requests in the same sequence as a receiving sequence from the IO device 50.

Moreover, the reception queue 110 stores the data of the number of recordable store requests (hereinafter, "recordable store request number") and reduces the recordable store request number by one each time the store request is received from the IO device 50. When the store request is received, the reception queue 110 determines whether the recordable store request number is equal to or lower than zero. When the recordable store request number is equal to or lower than zero, the reception queue 110 outputs to the IO device 50, the notification indicating that no store requests can be received.

The response circuit 120 manages the recordable store request number stored in the reception queue 110 and also outputs the storage completion notification to the IO device 50. Specifically, when the notification indicating completion of recording of the storage target data is received from the MAC 20, the response circuit 120 controls the reception queue 110 so that the recordable store request number that is stored in the reception queue 110 is incremented by one.

When the request ID corresponding to an invalidated data is received from the snoop circuit 140, the response circuit 120 outputs the received request ID to the IO device 50 as the storage completion notification. When no invalidation is carried out, in other words, when no data is found in the cache, the response circuit 120 receives from the snoop circuit 140, the request ID corresponding to the store request not found in the cache and outputs the received request ID to the IO device 50.

The storage-data temporarily-storing queue 130 records the storage target data received from the reception queue 110. Corresponding to control commands from the snoop circuit 140, the storage-data temporarily-storing queue 130 outputs the storage target data to the MAC 20.

The snoop circuit 140 issues the invalidation request to the CPU 30 or the CPU 40 and also issues to the MAC 20, the request for recording the storage target data in the memory 10. The invalidation request issued to the CPU 30 or the CPU 40 is explained first.

The snoop circuit 140 stores registration data in the cache in the CPUs 30 and 40. A relationship between the data recorded in the cache and the data recorded in the memory 10 is stored in the registration data. By referring to the registration data, the snoop circuit 140 can determine whether the data registered in the cache is already recorded under the address on the memory 10 that records therein the storage target data (can determine whether the data is found in the cache).

When the request ID and the storage target data address are received from the reception queue 110, the snoop circuit 140 compares the received address and the registration data, and determines whether the address is found in the cache (performs a snoop process). When the address is found in the cache, the snoop circuit 140 outputs to the CPU 30 or the CPU 40, the address found in the cache and issues a data invalidation request.

Subsequently, when the invalidation completion notification is received from the CPU 30 or the CPU 40, the snoop circuit 140 outputs to the response circuit 120, the request ID corresponding to the address identical to the address of the invalidated data, and notifies that the data invalidation is complete.

At the same time, the snoop circuit 140 compares the address that is received from the reception queue 110 and the registration data. When no address is found in the cache, the snoop circuit 140 outputs to the response circuit 120, the request ID corresponding to the address not found in the cache and notifies that the data invalidation is complete.

The request for recording the storage target data issued by the snoop circuit 140 to the MAC 20 is explained below. When the request ID and the address are received from the reception queue 110, the snoop circuit 140 assigns a lock number to the received request ID and the address, and registers it in an address lock register 140a. The lock number is an identification number to identify the request ID inside the SC 100. Even when identical request IDs exist in the address lock register 140a, the SC 100 can identify each request ID by the lock number.

FIG. 3 is an example of the data recorded in the address lock register 140a. As shown in FIG. 3, the data recorded in the address lock register 140a includes the lock numbers, lock valid data, the request IDs, and the addresses. The lock valid data indicates whether the address corresponding to the lock number is locked.

When recording the request ID and the address in the address lock register 140a, if the storage destination address is already locked by another request ID (when the lock valid data is "valid"), the snoop circuit 140 awaits till the lock is released. On the other hand, if the address is not yet locked by another request ID (when the lock valid data is "invalid") and if the lock is released (when the lock valid data changes from "valid" to "invalid"), the snoop circuit 140 registers in the address lock register 140a, the request ID and the address by establishing a correspondence with the lock number, and also changes the lock valid data to "valid".

Upon registering the request ID and the address in the address lock register 140a, the snoop circuit 140 causes the storage-data temporarily-storing queue 130 to output the storage target data recorded therein to the MAC 20. The snoop circuit 140 also reads from the address lock register 140a, the address corresponding to the output storage target data and the lock number corresponding to the address, and outputs the address and the lock number to the MAC 20. When the storage target data, the address, and the lock number are received from the SC 100, the MAC 20 records the storage target data under the address on the memory 10 and outputs to the response circuit 120, the notification that the storage target data recording is complete. The MAC 20 also outputs the lock number to the snoop circuit 140 and releases the lock corresponding to the lock number (causes the snoop circuit 140 to update the lock valid data from "valid" to "invalid").

Figure 4:
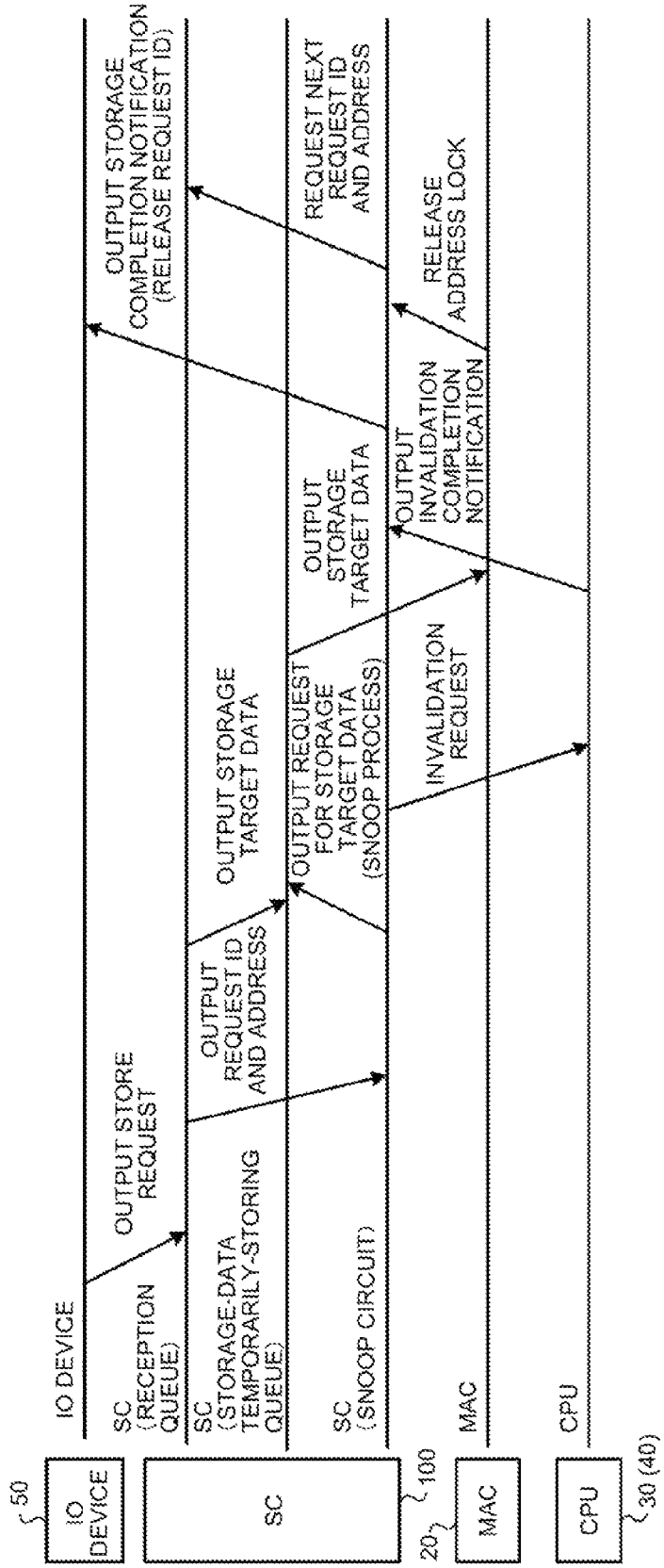
FIG. 4 is a time chart of process taking place in the recording control system.

Process taking place in the recording control system according to the present embodiment is explained below with reference to FIG. 4. FIG. 4 is a time chart of the process taking place in the recording control system. As shown in FIG. 4, the IO device 50 outputs the store request to the reception queue 110. The reception queue 110 outputs the request ID and the address to the snoop circuit 140 and outputs the storage target data to the storage-data temporarily-storing queue 130.

Along with performing the snoop process, the snoop circuit 140 outputs an output request for the storage target data to the storage-data temporarily-storing queue 130 and the invalidation request (when the data is found in the cache) to the CPU 30 or the CPU 40. The storage-data temporarily-storing queue 130 outputs the storage target data to the MAC 20. Meanwhile, the CPU 30 or the CPU 40 completes the invalidation of the invalidation target data and outputs the invalidation completion notification to the snoop circuit 140.

When the invalidation completion notification is received, the snoop circuit 140 outputs the request ID to the response circuit 120 to cause the response circuit 120 to output the storage completion notification to the IO device 50. The IO device 50 that receives the storage completion notification releases the request ID in the request managing table 50a that corresponds to the request ID included in the storage completion notification.

Upon recording the storage target data in the memory 10, the MAC 20 outputs to the snoop circuit 140, the lock number corresponding to the storage target data, releases an address lock (causes the snoop circuit 140 to update the lock valid data from "valid" to "invalid"), and requests the next request ID and the address to the reception queue 110.

Thus, upon receiving the invalidation completion notification from the CPU 30 or the CPU 40, the snoop circuit 140 outputs the storage completion notification along with the request ID to the IO device 50. Therefore, the IO device 50 can rapidly process the storage target data, and the performance of the entire recording control system can be enhanced.

Figure 5:
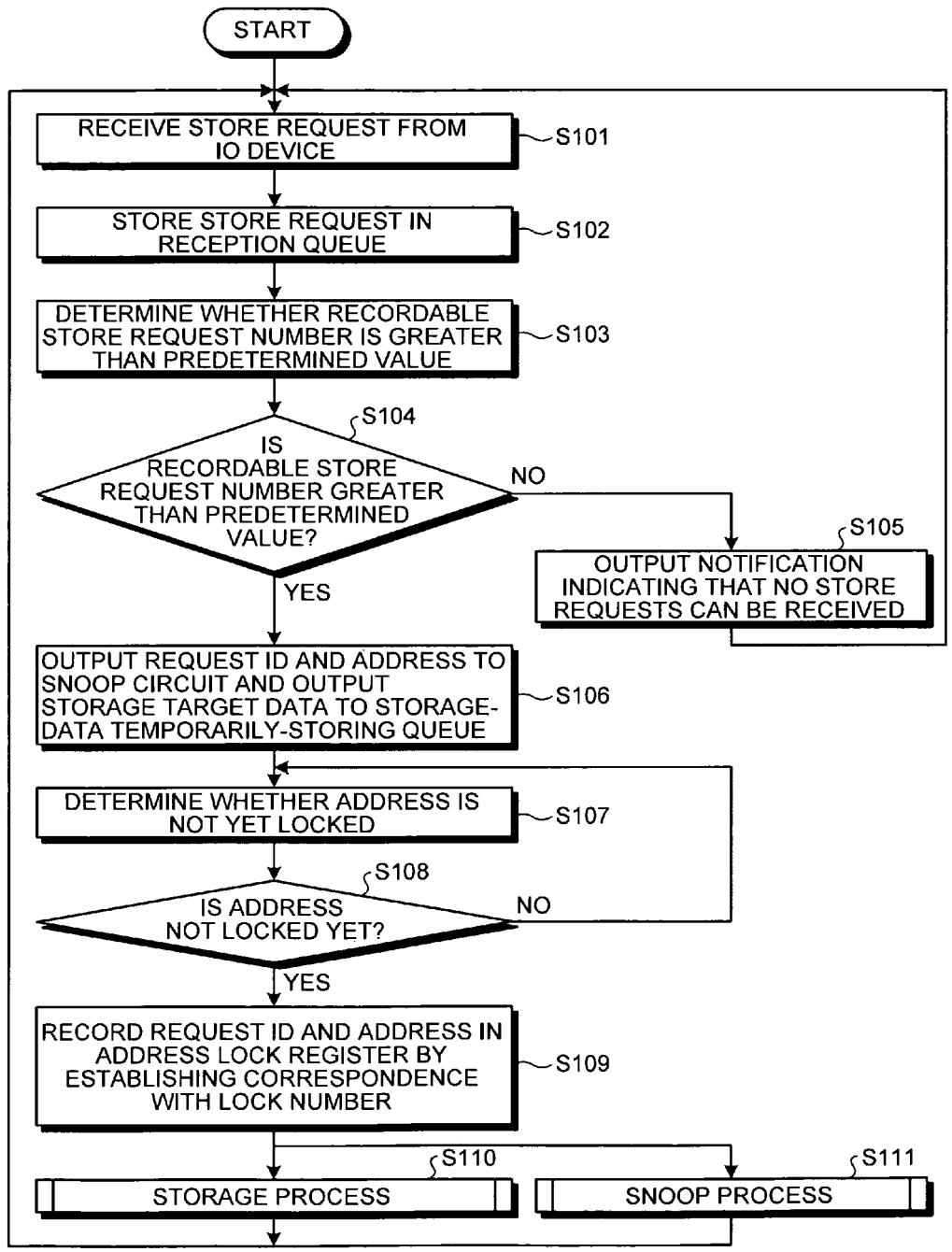
FIG. 5 is a flowchart of process performed by an SC according to the embodiment of the present invention.

The process performed by the SC 100 according to the present embodiment is explained below with reference to FIG. 5. FIG. 5 is a flowchart for explaining the process performed by the SC 100 according to the present embodiment. As shown in FIG. 5, the SC 100 receives the store request from the IO device 50 (Step S101) and stores the received store request in the reception queue 110 (Step S102).

The reception queue 110 determines whether the recordable store request number is equal to or greater than a predetermined value (for example, equal to or greater than one) (Step S103). If the recordable store request number is less than the predetermined value (No at Step S104), the reception queue 110 outputs to the IO device 50, a notification indicating that no store requests can be received (Step S105), and the system control returns to Step S101.

On the other hand, if the recordable store request number is greater than or equal to the predetermined value (Yes at Step S104), the reception queue 110 outputs the request ID and the address to the snoop circuit 140 and outputs the storage target data to the storage-data temporarily-storing queue 130 (Step S106).

The snoop circuit 140 determines whether the address is not yet locked (Step S107). At Step S107, when the request ID and the address are received from the reception queue 110, the snoop circuit 140 determines, based on the address lock register 140a, whether the address is already locked (determines whether the lock valid data is "valid").

If the address is already locked (if the lock valid data is "valid") (No at Step S108), the system control returns to Step S107. If the address is not yet locked (if the lock valid data is "invalid") (Yes at Step S108), the snoop circuit 140 records in the address lock register 140a, the request ID and the address by establishing a correspondence with the lock number and updates the lock valid data to "valid" (Step S109).

Subsequently, the snoop circuit 140 issues a storage process and the snoop process (Steps S110 and S111), and the system control returns to Step S101.

The storage process shown at Step S110 of FIG. 5 is explained below. FIG. 6 is a flowchart of the storage process. As shown in FIG. 6, the snoop circuit 140 sends the lock number, the address, and the storage target data to the MAC 20 (Step S201), and receives the storage completion notification from the MAC 20 upon completion of the storage target data recording (Step S202).

Upon receiving the storage completion notification from the MAC 20, the snoop circuit 140 refers to the lock number in the storage completion notification and releases the address lock (updates the lock valid data corresponding to the lock number from "valid" to "invalid") (Step S203), and the response circuit 120 increments the recordable store request number (Step S204).

The snoop process shown at Step S111 of FIG. 5 is explained below. FIG. 7 is a flowchart of the snoop process. As shown in FIG. 7, the snoop circuit 140 compares the registration data and the address received from the reception queue 110 and determines whether the address is found in the cache (Step S301).

If the address is found in the cache (Yes at Step S302), the snoop circuit 140 issues the invalidation request to the CPU 30 or the CPU 40 (Step S303) and receives the invalidation completion notification from the CPU 30 or the CPU 40 after the CPU 30 or the CPU 40 completes invalidation (Step S304).

The snoop circuit 140 outputs to the response circuit 120, the request ID corresponding to the invalidation target data, and the response circuit 120 further outputs to the IO device 50, the storage completion notification that includes the request ID (Step S305).

On the other hand, if no address is found in the cache (No at Step S302), the snoop circuit 140 moves to Step S305. In this case, the snoop circuit 140 outputs to the response circuit 120, the request ID corresponding to the address not found in the cache.

Thus, upon receiving the invalidation completion notification from the CPU 30 or the CPU 40, the SC 100 outputs to the IO device 50, the request ID of the store request corresponding to the invalidation target data and notifies that the invalidation is complete. Therefore, the IO device 50 can effectively process the storage target data.

As mentioned above, in the recording control system according to the present embodiment, the IO device 50 outputs the store request to the SC 100, and the SC 100 compares the registration data and the address in the store request and determines whether to issue the invalidation request. When it is determined that the invalidation request is to be issued, the SC 100 issues the invalidation request to the CPU 30 or the CPU 40. Upon receiving the invalidation completion notification, the SC 100 outputs to the IO device 50, the request ID corresponding to the invalidation request and notifies that the storage target data recording is complete. Thus, the IO device 50 can rapidly process the storage target data, so that the performance of the entire recording control system is enhanced.

Moreover, in the recording control system according to the present embodiment, because the request ID corresponding to the invalidated data is output to the IO device 50, the IO device 50 can significantly reduce the number of the request IDs that needs to be managed, so that the circuits can be simplified (a request ID managing method is simplified).

Furthermore, in the recording control system according to the present embodiment, the response circuit 120 manages the recordable store request number of the reception queue 110. When the notification indicating completion of recording of the storage target data is received from the MAC 20, the response circuit 120 increments the recordable store request number, thus enabling to receive the store request effectively from the IO device 50.

Moreover, in the recording control system according to the present embodiment, when the request ID is received, the snoop circuit 140 manages assigning the lock number to the request ID. Thus, even when the snoop circuit 140 receives identical request IDs, because each request ID can be identified by a unique lock number, the request IDs can be correctly processed.

According to an aspect of the present invention, data can be rapidly processed, so that performance of an entire recording control system that includes a recording controller can be enhanced. Also, an amount of data that should be managed by a device that serves as an output source for outputting recording requests can be reduced, so that a circuitry can be simplified.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A recording controller that controls recording of data in a cache and a memory provided in a processor, the recording controller comprising:
   a snoop unit that, when a second data is recorded on a recording location for a first data that is to be recorded in the memory and a third data corresponding to the second data is recorded in the cache, issues an invalidation request for invalidating the third data; and
   a response unit that, when the third data is invalidated, outputs a notification indicating that recording of the first data is completed and including an identification information for identifying the recording request for the first data to an output source of a recording request for the first data.

2. The recording controller according to claim 1, wherein the snoop unit assigns an identification number to each recording request to prevent, upon receiving a recording request that includes an identification information for requesting recording of the first data in the memory, overlapping of the identification information of the received recording request and an identification information of the recording request corresponding to an invalidation request data.

3. The recording controller according to claim 2, wherein the snoop unit manages number of recording requests receivable in a buffer and determines whether to receive a recording request based on the number of the recording requests.

4. The recording controller according to claim 3, wherein the snoop unit increments, upon receiving a notification that recording of the first data is completed, the number of the recording requests.

5. A recording control method for controlling recording of data in a cache and a memory provided in a processor, the method comprising:
   issuing, when a second data is recorded on a recording location for a first data that is to be recorded in the memory and a third data corresponding to the second data is recorded in the cache, an invalidation request for invalidating the third data; and
   outputting, when the third data is invalidated, a notification indicating that recording of the first data is completed and including an identification information for identifying a recording request for the first data to an output source of a recording request for the first data.

6. The recording control method according to claim 5, further comprising assigning an identification number to each recording request to prevent, upon receiving a recording request that includes an identification information for requesting recording of the first data in the memory, overlapping of the identification information of the received recording request and an identification information of the recording request corresponding to an invalidation request data.

7. The recording control method according to claim 6, further comprising managing number of recording requests receivable in a buffer, wherein
the managing includes determining whether to receive a recording request based on the number of the recording requests.

8. The recording controller according to claim 7, wherein the managing includes incrementing, upon receiving a notification that recording of the first data is completed, the number of the recording requests.

* * * * *